United States Patent
Tabatowski-Bush et al.

(10) Patent No.: US 10,850,725 B2
(45) Date of Patent: Dec. 1, 2020

(54) VEHICLES WITH MODULAR PARALLEL HIGH VOLTAGE BATTERIES

(71) Applicant: FORD GLOBAL TECHNOLOGIES, LLC, Dearborn, MI (US)

(72) Inventors: Benjamin A. Tabatowski-Bush, South Lyon, MI (US); Kyle Krueger, Dearborn, MI (US); Abdul Lateef, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 15/835,874

(22) Filed: Dec. 8, 2017

(65) Prior Publication Data

US 2019/0176803 A1    Jun. 13, 2019

(51) Int. Cl.
| | |
|---|---|
| *H02J 7/00* | (2006.01) |
| *B60W 20/13* | (2016.01) |
| *H01M 2/10* | (2006.01) |
| *B60L 58/12* | (2019.01) |
| *B60L 3/04* | (2006.01) |
| *B60L 58/21* | (2019.01) |
| *B60L 58/22* | (2019.01) |

(52) U.S. Cl.
CPC .............. *B60W 20/13* (2016.01); *B60L 3/04* (2013.01); *B60L 58/12* (2019.02); *B60L 58/21* (2019.02); *B60L 58/22* (2019.02); *H01M 2/1077* (2013.01); *H01M 2/1083* (2013.01); *B60L 2270/20* (2013.01)

(58) Field of Classification Search
CPC ......... B60W 20/13; B60L 58/22; B60L 58/12; B60L 58/21; B60L 3/04; H01M 2/1077; H01M 2/1083; H02J 7/34; H02J 7/0024

USPC ......................................................... 320/116
See application file for complete search history.

(56) References Cited

U.S. PATENT DOCUMENTS

| | | | |
|---|---|---|---|
| 7,772,799 B2 | 8/2010 | Wu | |
| 9,478,779 B2 | 10/2016 | Burkman | |
| 2015/0021985 A1* | 1/2015 | Matsuda | .................. B60L 58/21 |
| | | | 307/10.1 |
| 2016/0261127 A1* | 9/2016 | Worry | ................. H01M 10/425 |

(Continued)

FOREIGN PATENT DOCUMENTS

WO    WO13188680    12/2013

*Primary Examiner* — Nathaniel R Pelton
(74) *Attorney, Agent, or Firm* — David B Kelley; Brooks Kushman P.C.

(57) ABSTRACT

A hybrid electric vehicle having battery packs coupled to the vehicle in parallel, which each include series-connected cells, a single contactor, a battery pack controller that detects cell voltages, and at least one controller coupled to a bus contactor and the packs. Responsive to a vehicle key on signal, the at least one controller closes the single battery pack contactor for at least one of the battery packs that includes voltage balanced cells. The bus contactor is then closed to deliver electrical power to the vehicle, and may include a precharge contactor that is closed in advance of and until the bus contactor open circuit voltage is reduced to a contactor voltage difference. The battery pack controllers are further configured to detect voltage, current, and temperature of each cell, to open the single contactor, and to adjust the state of charge of unbalanced cells until balanced relative with the others.

14 Claims, 3 Drawing Sheets

(56) References Cited

U.S. PATENT DOCUMENTS

2017/0166065 A1* 6/2017 Hong ................... H02J 7/0021
2018/0219391 A1* 8/2018 Ishikawa ............... H02J 7/0026

* cited by examiner

VEHICLES WITH MODULAR PARALLEL HIGH VOLTAGE BATTERIES

TECHNICAL FIELD

The present disclosure relates generally to systems and methods for control and utilization of modular and parallel high voltage batteries in an electric vehicle.

BACKGROUND

Electric, plug-in, battery, full, and mild hybrid electric vehicles (HEVs), have a powertrain that includes, among other components, an internal combustion engine (CE), electric machines or motor/generators (EMs), batteries and other energy storage devices, that are coupled with one or more controllers. Such batteries typically have dozens and hundreds of cells arranged in series with one another to generate a desired output voltage, and include positive and negative biased contactors that must be closed to a vehicle bus to enable operation. However, if any single cell or cells in the series is/are not balanced within a voltage threshold relative to the other cells, the entire battery cannot be brought online and closed to the vehicle bus. Instead, the battery must remain off-line and unavailable for use until the unbalanced cell(s) is/are balanced with the others and/or the entire battery pack is replaced with a unit having balanced cells.

SUMMARY

A hybrid electric vehicle is disclosed having battery packs that are coupled in parallel with the vehicle. Each battery includes conventional, series connected cells, but is configured with a battery pack controller that detects cell voltages among other capabilities, and only a single contactor. The vehicle also includes at least one vehicle controller coupled with the battery packs, which among other capabilities, is configured to operate a vehicle bus contactor to connect and disconnect the battery packs to the vehicle.

Responsive to a vehicle key on signal, one or more of the vehicle controller(s) and/or the battery pack controller operates and closes the single battery pack contactor, for at least one of the battery packs having voltage balanced cells. The battery pack controller detects the voltage of the respective cells of the same battery pack, and detects whether each of the cells are within a voltage threshold relative to each other, and also detects that the cells are voltage balanced when within the voltage threshold, and otherwise unbalanced.

When an unbalanced condition is detected, the battery pack controller rejects a close command from the at least one vehicle controller, such that the battery pack contactor remains open. When unbalanced, and while the battery pack contactor remains open, the battery pack controller is further configured to enable current flow between the cells such that the unbalanced cell(s) are balanced until within the voltage threshold relative to the remaining cells.

Also responsive to the key on signal, and at least one battery pack having balanced cells and a closed battery pack contactor, the at least one controller is further configured to close the vehicle bus contactor, such that electrical power is delivered to the vehicle. Also coupled with the vehicle contactor is a precharge contactor, which is closed by the at least one controller in advance of closing the bus contactor. The precharge contactor is commanded by the at least one controller to remain closed, such that the voltage across terminals of the open bus contactor is reduced to a contactor voltage difference. Thereafter, the at least one controller closes the vehicle bus contactor and opens the precharge contactor.

In other modifications, each battery pack controller is further configured to reject a close command from the at least one vehicle controller, and to open the single battery pack contactor, in response to the detected voltage of any cell being unbalanced relative to the remaining cells, and to adjust the state of charge of unbalanced cells until balanced relative to the remaining cells. The battery pack controllers in variations of the disclosure are further configured to (a) detect voltage, current, and temperature of each cell, (b) to open the single contactor, and (c) to adjust the state of charge of unbalanced cells until balanced relative with the remaining cells, among other capabilities. In these arrangements and in further adaptations, the battery pack controller is also configured to detect an out of range condition for one or more of the voltage, current, and temperature each cell, and in response to open the single battery pack contactor.

The disclosure is also directed to the single battery pack contactor of each battery pack coupled to a negative terminal of the battery pack and a negative terminal of a vehicle power bus, and the bus contactor coupled to a positive terminal of the vehicle power bus. Additional variations include a second bus contactor coupled to the negative terminal of the vehicle power bus, the single battery pack contactor configured as normally closed, and the bus contactor and second bus contactor configured as normally open.

Each of the contemplated arrangements of the disclosure also include further modifications wherein the at least one controller is also configured to command another of the single battery pack contactors to close, for respective battery packs having cells that meet the voltage threshold. In variations that include the battery pack controller configured to open the single battery pack contactor, when unbalanced cells are detected, the battery pack controller is also modified to adjust the state of charge of unbalanced cells until balanced with the remaining cells, according to the voltage threshold. Once the cells are balanced, the battery pack controller also is configured to close the single battery pack contactor for the respective battery pack, such that the respective pack delivers power to the vehicle.

This summary of the implementations and configurations of these vehicles and methods of operation describe in less technically detailed variations, several exemplary arrangements for the embodiments of this disclosure, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example configurations, as is further described elsewhere herein, and which may also be understood by those skilled and knowledgeable in the relevant fields of technology, with reference to the following description and drawings.

DETAILED DESCRIPTION

Embodiments of the present disclosure are described herein. It is to be understood, however, that the disclosed embodiments are merely examples, and that other embodiments and alternative arrangements thereof can take other various and preferably optional forms. The figures include some features that may be exaggerated or minimized to show or emphasize details of certain components. Therefore, specific structural and functional details disclosed herein are not to be interpreted as limiting, but merely as a representative and illustrative basis for demonstrating to and teaching those skilled in the art to variously employ the embodiments of this disclosure.

As those of ordinary skill in the art should understand, various features, components, and processes illustrated and described with reference to any one of the figures may be combined with features, components, and processes illustrated in one or more other figures to produce embodiments that should be apparent to and within the knowledge of those skilled in the art, but which may not be explicitly illustrated or described. The combinations of features illustrated here are representative embodiments for many typical applications. Various combinations and modifications of the features consistent with the teachings of this disclosure, however, could be desired for particular applications or implementations, and should be readily within the knowledge, skill, and ability of those working in the relevant fields of technology.

Figure 1:
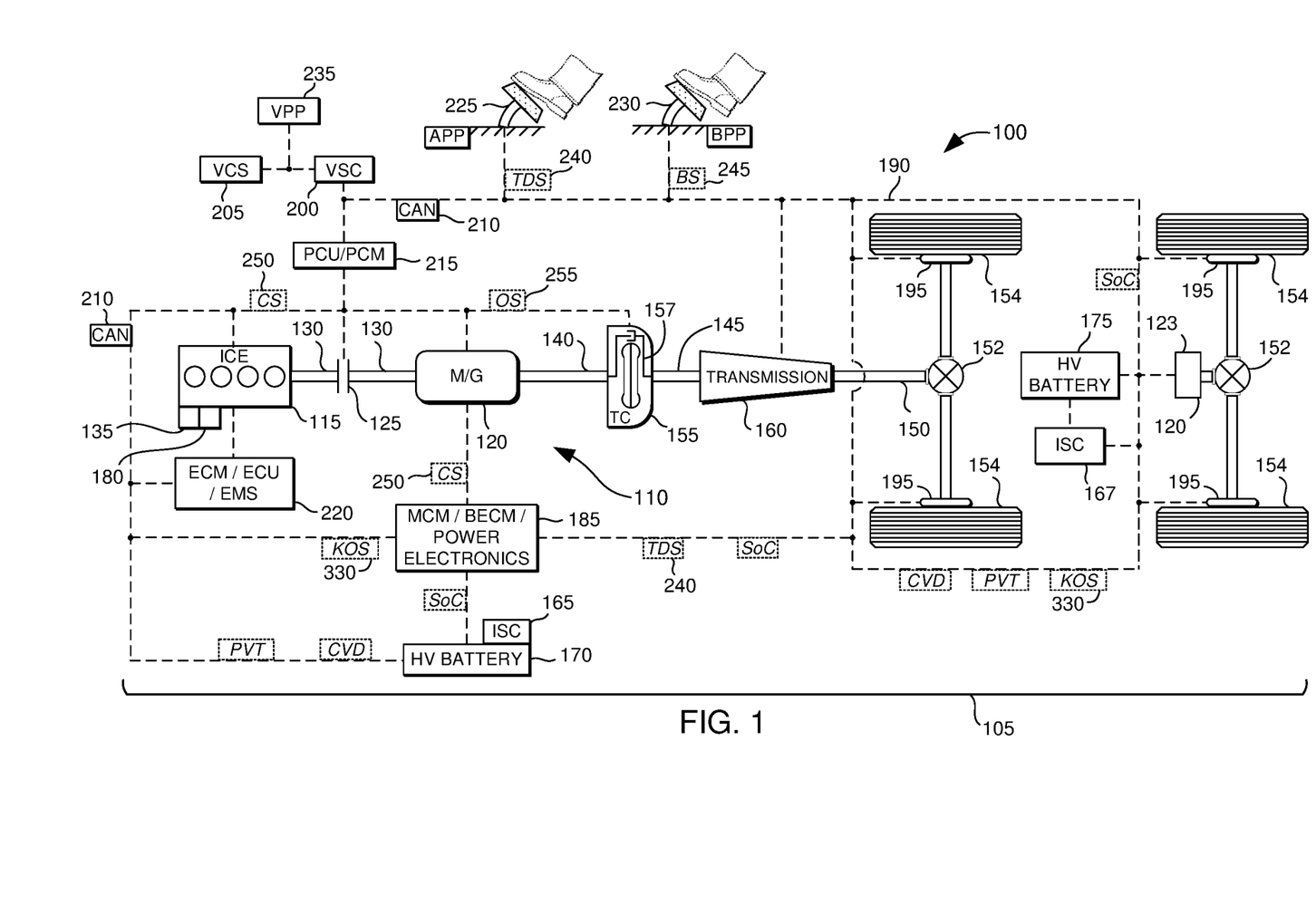
FIG. 1 is an illustration of a hybrid electric vehicle and its systems, components, sensors, and methods of operation.
Figure 2:
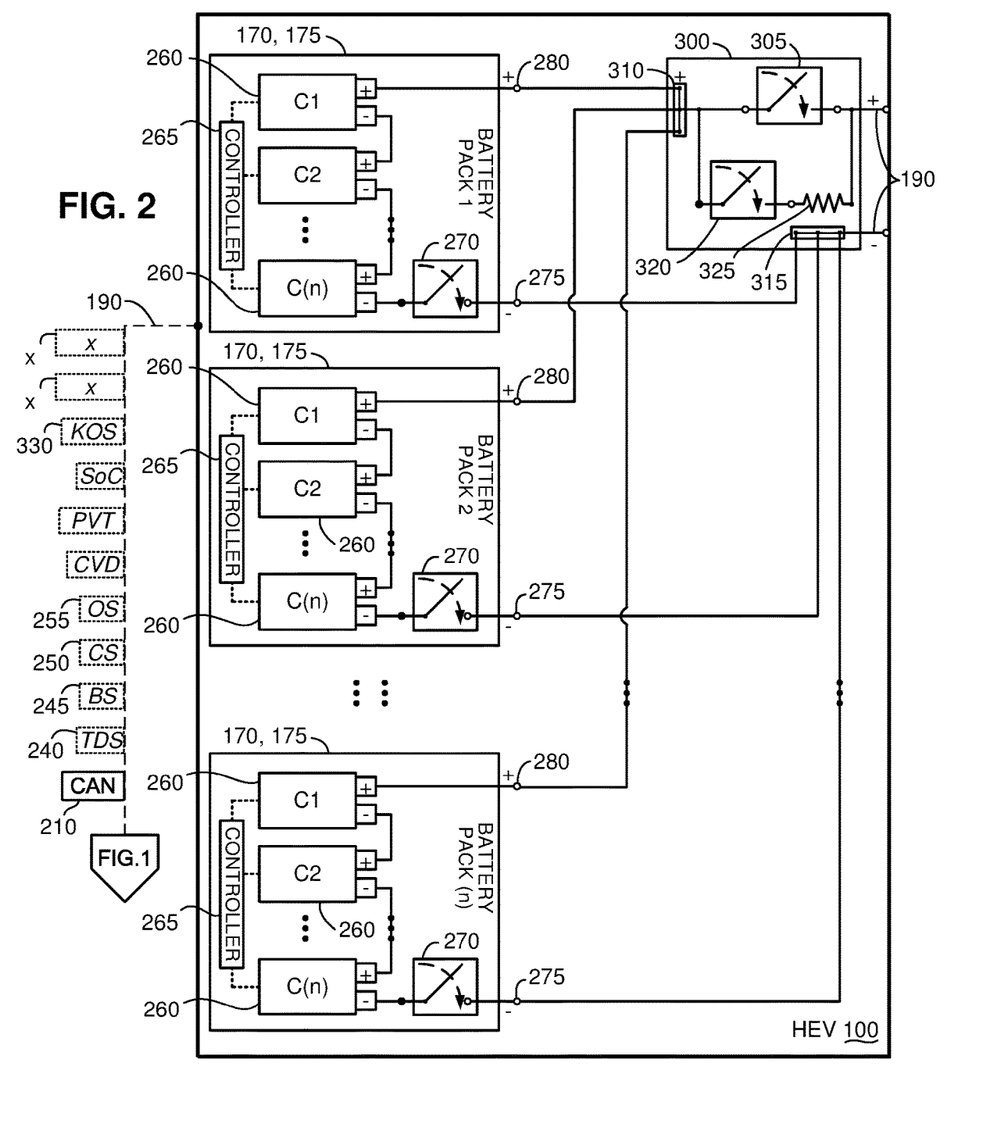
FIG. 2 illustrates additional aspects and capabilities of the vehicle and systems and methods of FIG. 1, with certain components and features added, removed, modified, and rearranged.

With reference now to the various figures and illustrations and to FIGS. 1 and 2, and specifically to FIG. 1, a schematic diagram of an electric, battery, plug-in, and/or HEV 100 is shown, and illustrates representative relationships among components of HEV 100. Physical placement and orientation of the components within vehicle 100 may vary. Vehicle 100 includes a driveline 105 that has a powertrain 110, which includes one or more of an internal combustion engine (CE, ICE) 115 and/or electric machine or electric motors/generators/starters (EMs) 120, which generate power and torque to propel vehicle 100. Although the figures depict the various components appearing to be physically adjacent, the figures are only intended to be schematic representations, and contemplate such components to be arranged according to various other physical arrangements.

Engine 115 is a gasoline, diesel, biofuel, natural gas, or alternative fuel powered engine, or a fuel cell, which generates an output torque in addition to other forms of electrical, vacuum, pressure, and hydraulic power by way of front end engine accessories and accessory devices (FEADs) described elsewhere herein. ICE or CE 115 is coupled to at least one of the electric machines or EMs 120 with a disconnect clutch 125. CE 115 generates such power and associated engine output torque for transmission to EM 120 when disconnect clutch 125 is at least partially engaged.

EM 120 may be any one of a plurality of types of electric machines, and for example may be a permanent magnet synchronous motor, an electrical power generator, and an engine starter. For example, when disconnect clutch 125 is at least partially engaged, power and torque may be transmitted from engine 115 to EM 120 to enable operation as an electric generator, and to other components of vehicle 100. Similarly, the EM 120 may operate as a starter for engine 115 with disconnect clutch 125 partially or fully engaged to transmit power and torque via disconnect clutch drive shafts 130 to CE 115 to start engine/ICE/CE 115, in vehicles that include or do not include an independent engine starter 135.

In additional variations, EM 120 may also be an electric axle drive 123 that is configured as either an electric front axle drive (EFAD) or an electric rear axle drive (ERAD) that is directly coupled to and/or via a gear box to differential 152. Further, in such arrangements EFAD/ERAD 123 may be configured to operate independently of other EMs 120 and/or CE 115, to enable selectable and differential control between associated wheels 154.

Further, at least one EM 120, 123 may assist engine 115 in a "hybrid electric mode" or an "electric assist mode" by transmitting additional power and torque to turn drive shafts 130 and 140. Also, EMs 120, 123 may operate in an electric only mode wherein engine 115 is decoupled by disconnect clutch 125 and shut down, enabling EMs 120, 123 to transmit positive or negative torque to EM drive shaft 140. When in generator mode, EMs 120, 123 may also be commanded to produce negative torque and to thereby generate electricity for charging batteries (and other energy storage devices) and powering vehicle electrical systems, while engine or ICE 115 is generating propulsion power for vehicle 100. EMs 120, 123 also may enable regenerative braking by converting rotational energy from decelerating powertrain 110 and/or wheels 154 into electrical energy for storage, as described in more detail below, in one or more batteries 170, 175, 180, and other energy storage devices.

Disconnect clutch 125 may be disengaged to enable engine 115 to stop or to run independently for powering engine accessories, while EMs 120, 123 generate drive power and torque to propel vehicle 100, and/or EM drive shaft 140, torque convertor drive shaft 145, and transmission output drive shaft 150. In other arrangements, both engine 115 and EMs 120, 123 may operate with disconnect clutch 125 fully or partially engaged to cooperatively propel vehicle 100 through drive shafts 130, 140, 150, differential 152, and wheels 154. Various configurations and utilizations of EMs 120, 123 may be employed to enable differential control and traction between wheels 154.

Differentials 152 may transmit approximately equal torque to each wheel 154 and may accommodate slight speed differences to enable the vehicle to efficiently turn and maneuver. Different types of differentials 152 or similar devices may be used to distribute equal and/or unequal torque from powertrain 110 to wheels 154, for rear-dive, front-drive, front-axle, rear-axle, and all-wheel drive vehicles and configurations. In some vehicles, differential torque distribution may be controlled and varied to enable desired operating modes or conditions wherein each wheel 154 receives different torque. Similarly, during regenerative braking modes, EMs 120, 123 may be configured to recapture mechanical energy from wheels 154 to generate electrical energy for recharging one or more batteries 170, 175, 180.

Drive shaft 130 of engine 115 and EM 120 may be a continuous, single, through shaft that is part of and integral with EM drive shaft 140, or may be a separate, independent drive shaft 130 that may be configured to turn independently of EM drive shaft 140, for powertrains 110 that include multiple, inline, or otherwise coupled EM 120 configurations. The schematic of FIG. 1 also contemplates alternative configurations with more than one engine 115 and/or EMs 120, 123, which may be offset from drive shafts 130, 140, and where one or more of engines 115 and EMs 120, 123 are positioned in series and/or in parallel elsewhere in driveline 105, such as between or as part of a torque convertor and a transmission, off-axis from the drive shafts, and/or elsewhere and in other arrangements. Still other variations are contemplated without deviating from the scope of the present disclosure.

Driveline 105 and powertrain 110 also include a torque convertor (TC) 155, which couples CE 115 and EM 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100. Transmission 160 may include TC 155 and bypass clutch 157 to be integral with transmission or gearbox 160 in some variations. In other contemplated variations, for purposes of further example but not limitation, HEV 100 is configured to be a powersplit vehicle, such that transmission 160 is configured in a power-split transmission arrangement that is employed without differentials 152 and/or without TC 155 to enable direct control of power transmitted to and regenerative power recovered or captured from wheels 154. See, for example, U.S. Pat. Nos. 9,694,663 and 8,425,377, among others.

Powertrain 110 and/or driveline 105 further include one or more invertor system controller(s) (ISC or ISCs) 165, which are coupled to the various other system controller(s) and respective EMs 120, 123 and batteries 170, 175, and/or 180, any and/or each of which components may be cooperatively and independently adjustable, selectable, and operable. In some optionally preferred arrangements, at least one EM 120 is respectively coupled with battery 170 and ISC 165, and another EM 120, such for example EM 123, is respectively coupled with a different and separate battery 175, and a different and separate ISC 167.

High voltage batteries 170, 175, and/or low voltage battery 180 are configured as removable, modular battery packs 170, 175, 180 that are coupled in parallel with each other and to a vehicle power bus 190. For purposes of illustration, vehicle power bus 190 is depicted in FIG. 1 and the related figures schematically with related data buses and networks as further detailed elsewhere herein. Each such battery pack 170, 175, 180 each include internal cells connected in series, as also described in more detail elsewhere herein.

Such vehicle power buses, including vehicle bus 190, according to the disclosure, may be understood by those skilled in the technology of this disclosure, and are described in more detail by a number of industry standards, which include for example, among others, Society of Automotive Engineers International™, SAE J1654, High Voltage Primary Cable, J1673, High Voltage Automotive Wiring Assembly Design, J1715, Electric Vehicle Terminology, J1742, Connections for high voltage on-board road vehicle electrical wiring harnesses, J1772, Electric Vehicle Conductive Coupling, J1773, Electric Vehicle Inductive Coupling, J1797, Packaging of Electric Vehicle Battery Modules, and/or J2183, 60 V and 600 V Single Core Cables, among others, available from standards.sae.org.

Such vehicle power bus standards are also contemplated by standards available from International Standards Organization, and include for example without limitation ISO 6469-1, Electric road vehicles—Safety specifications—Part 1: On-board electrical energy storage, and/or ISO 6469-2, Electric road vehicles—Safety specifications—Part 2: Functional safety means and protection against failures, among others, available from www.iso.org. In other examples, standards from Underwriters Laboratories, may also be useful to the skilled person, including for example but not limitation UL 1248, Engine Generator Assemblies for Use in Recreational Vehicles, UL 458, Power Converters and Power Converter/Inverter Systems for Land Vehicles and Marine Crafts, and/or UL 2202, Electric Vehicle (EV) Charging System Equipment, among others, and available from ulstandards.ul.com.

One or more such batteries 170, 175 are and may be a higher voltage, direct current battery or batteries 170, 175 operating in various ranges according to the intended vehicle configuration and applications. In various examples, illustrated here for purposes of example but not limitation, such batteries can be configured to operate in ranges up to about 600 volts, and prospectively as high as about 1,000 volts, and sometimes between about 140 and 420 volts, or more or less, which is/are used to store and supply power for EM 120, and other vehicle components and accessories. Other batteries can be a low voltage, direct current battery(ies) 180 operating in the range of between about 6 and 24 volts and 48 volts, or more or less, which is/are used to store and supply power for starter 135 to start CE 115, for such exemplary HEVs 100 that may include a starter in some adaptations, and for powering other vehicle components and accessories during vehicle idle, stop, engine off, and electric motor/generator off conditions.

Although the batteries 170, 175, 180 described here for purposes of example may be known to those skilled in the technology as lead-acid, lithium ion, nickel metal hydride, and other chemistries, many other energy storage devices are contemplated herein as being suitable for purposes of the disclosure. For further example, such batteries 170, 175, 180 may cooperatively storage energy with and/or may be replaced entirely by ultracapacitors, flywheels, fuel cells, and a number of energy storage devices and associated components and systems, which may be utilized alone, in combination, and as supplemental and/or replacement devices for the contemplated energy storage purposes of the exemplary and illustrative chemical batteries.

In these arrangements, and for various HEVs 100 that may be configured as a plug-in HEV (PHEV), and/or full HEV (FHEV), one or more of the batteries 170, 175 may be further configured to operate in charge sustain and/or charge depletion modes according to the mode of vehicle operation and configuration of the specific battery. Those skilled in the field of technology may be able to understand that such exemplary, combined charge sustain and charge depletion modes of operation are typically confined to such HEVs 100 that are configured with at least one PHEV configured battery or batteries, since other types of such contemplated batteries are designed and/or preferred for non-PHEV modes of operation such as either charge sustain or charge depletion modes but not both.

For further example, battery(ies) 170, 175 may be selected and configured to have an energy capacity of approximately one kilowatt-hour. This exemplary arrangement is for purposes of illustration, and as a further example can enable an electric range or operating range of about 1 to 3 miles or so during vehicle speeds under about 30 miles per hour and when vehicle accelerations are mild. In this way, the batteries 170, 175 may be utilized in FHEVs as a "power cell" battery enabling relatively high discharge rates at up to charge depletion and/or charge sustain maximum discharge limit rates, for comparatively short time durations and limited distances, speeds, and accelerations, when compared to other types of battery configurations and HEV modes of operation.

In another example, at least one and/or another of the battery(ies) is configured to operate in alternating and/or both charge sustain and charge depletion modes, and in some applications as a power cell and in other applications as an "energy cell" and PHEV battery. For further examples, but not for purposes of limitation, such batteries and/or may have an energy range, depending upon the vehicle configuration and intended applications, of approximately between 2 and 10 kilowatt-hours, or more or less, and an electric operating range or electric range of about between 2 and 49 miles, or more or less. When utilized in combination with the various controller(s) of such HEVs 100, such as ISCs 165, 167, and other components, these batteries, for purposes of example without limitation, can be utilized in FHEV and PHEV configured HEVs 100, and may be employed with various other of such batteries 170, 175 to increase flexibility in configuring and utilizing such HEVs 100 and integrated components and systems.

The disclosure further contemplates one or more and/or at least one battery(ies) being configured in other variations and modifications to operate in a PHEV charge depletion mode as an energy cell having relatively higher energy storage capacity and time/distance utilization ranges, and to have an energy capacity of approximately exceeding 10 kilowatt-hours, or thereabout, and an electric range or electric operating range exceeding about 50 miles or so, and which can be adapted to have an energy capacity of approximately 10 to 30 kilowatt-hours or more or less, and an electric operating range of about 50 to 300 miles or more or less. Such "energy cell" configurations may be utilized in either or both charge deplete and sustain modes.

Batteries 170, 175, 180 are respectively coupled to engine 115, EMs 120, 123, ISCs 165, 167, and other components, controllers, and systems of vehicle 100, as depicted in FIG. 1, through various mechanical and electrical interfaces and vehicle controllers, as described elsewhere herein. High voltage EM batteries 170, 175 are coupled together and/or separately to EMs 120, 123, and ISCs 165, 167, by one or more of a motor control module (MCM), a battery energy and/or electrical control module (BCM or BECM), and/or power electronics 185.

These components are cooperatively configured to condition direct current (DC) power provided by high voltage (HV) batteries 170, 175 for EMs 120, 123. ISCs 165, 167, and/or MCM/BCM/BECM 185 are also configured to condition, invert, and transform DC battery power into three phase alternating current (AC) as is typically required to power electric machines or EMs 120, 123. MCM/BCM/BECM 185 and/or ISCs 165, 167 are also configured to charge one or more batteries 170, 175, 180 with electrical energy generated by EMs 120, 123, and/or FEAD components, and to supply power to other vehicle components as needed.

Vehicle 100 may also incorporate one or more brakes 195 coupled to one or more of wheels 154, and the various controllers contemplated herein. Brakes 195 and/or such controllers may be operative to mechanically (for example, frictionally) and/or electrically decelerate wheels 154, and to enable electrically regenerative braking that captures mechanical deceleration energy from wheels 154, and in cooperation with one or more of ISCs 165, 167, MCM/BECM 185, EMs 120, 123, and possibly other controllers and components, enables generation of electricity for storage in and charging of HV battery(ies) 170, 175, and other batteries 180, and other power storage components.

With continued reference to FIG. 1, vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with ISCs 165, 167, MCM/BECM 185, and other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

CAN 210 and related data networks and buses are depicted schematically herein in FIG. 1 and the related figures generally and for purposes of illustration, but not for purposes of limitation, as dashed lines that connect the various described components such that data communications are enabled throughout vehicle 100, and its components, systems, and subsystems. Additionally, also for purposes of example without limitation, vehicle power bus 190 is also depicted with such dashed lines as illustrated in FIG. 1 and related figures, which enables communication and delivery of electrical power throughout vehicle 100, and its systems, subsystems, and components.

Those knowledgeable in the relevant fields of technology of the disclosure may be able to comprehend that vehicle 100 typically will include separate and independent physical wiring that enables such data and power communication about vehicle 100, even though depicted in the figures utilizing the same dashed lines. Such schematic and illustrative use of the same dashed lines in the figures for both data, network, and/or power lines are also intended to describe such separate and independent wiring and wire harnesses of vehicle 100, and to also describe such exemplary configurations that may also utilize such wiring and wire harnesses to communicate both data and power in certain applications.

Those skilled in the technologies related to the disclosure may sometimes incorporate and/or utilize, for purposes of example, various industry standards that enable such dual use wiring and wire harnesses that are configured for both power and data, including for example without limitation, IEEE (Institute of Electrical and Electronic Engineers) powerline communication standard P1901, available at ieee.org, among others. IEEE P1901 contemplates power line communication within vehicle 100, and with off-board electric vehicle supply equipment (EVSE) such as charging stations, and external networks.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org.

While illustrated here for exemplary purposes, as discrete, individual controllers, ISCs 165, 167, MCM/BECM 185, VSC 200 and VCS 205 may control, be controlled by, communicate signals to and from, and communicate with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller," "at least one controller," "one or more controllers," and/or "the controller(s)" is intended to refer to such controllers both in the singular and plural connotations, and individually, collectively, and in various suitable cooperative, embedded, and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to modify, convert, precondition, and preprocess particular signals during communications, and before and after such are communicated.

In further illustrations, ISCs 165, 167, MCM/BECM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

With attention invited again to FIG. 1, vehicle 100 also may include VCS 205 to be the SYNC onboard vehicle computing system manufactured by the Ford Motor Company (See, for example, SmartDeviceLink.com, www.ford.com, U.S. Pat. Nos. 9,080,668, 9,042,824, 9,092,309, 9,141,583, 9,141,583, 9,680,934, and others). Vehicle 100 also may include a powertrain control unit/module (PCU/PCM) 215 coupled to VSC 200 or another controller, and coupled to CAN 210 and engine 115, EMs 120, 123, and TC 155 to control each powertrain component. A transmission control unit may also be coupled to VSC 200 and other controllers via CAN 210, and is coupled to transmission 160 and also optionally to TC 155, to enable operational control. An engine control module (ECM) or unit (ECU) or energy management system (EMS) 220 may also be included to be in communication with CAN 210, and is coupled to engine 115 and VSC 200 in cooperation with PCU 215 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, EMs 120, 123, TC 155, transmission 160, ISCs 165, 167, batteries 170, 175, 180, and MCM 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

The embodiments of vehicle 100 in FIG. 1 also depict exemplary sensors and actuators in communication with vehicle network and CAN 210 that can transmit and receive signals to and from VSC 200, VCS 205, and other controllers. In further examples, vehicle 100 may include an accelerator pedal position and motion sensor (APP) 225, a brake pedal position and motion sensor (BPP) 230, and other driver controls and vehicle profile and performance parameters (VPP) 235, which may include autonomously and/or driver selectable vehicle performance preference profiles and parameters, and autonomous and/or driver selectable vehicle operational mode configurations and sensors, and related profile parameters and settings.

Such VPPs 235 and settings may be autonomously and/or driver selectable, and may establish various preferred and/or predetermined vehicle performance characteristics and modes of operation, as described elsewhere herein. APP 225 may for example be coupled with the various controllers, such as PCU/PCM 215, ECM/ECU 220, and others, to generate and/or enable such controllers to generate a torque demand signal (TDS) 240.

BPP 230 may be further cooperatively coupled to and communicate with other systems, controllers, and sensors including for example brakes 195 and others, and be configured to generate and/or enable such controllers to generate a braking signal (BS) 245. Such controllers are and may be configured to respond to BS 245 and to adjust one or more and/or at least one of EMs 120, 123 to recover and capture mechanical braking energy to generate therefrom negative torque that is converted into electrical energy that is utilized to charge at least one of and/or each of the separate batteries 170, 175, and/or 180, and/or other energy storage devices.

Vehicle 100 may also have VCS 205 configured as and/or with one or more communications, navigation, and other sensors, as described with respect to the SYNC onboard vehicle computing system manufactured by the Ford Motor Company, and other similar systems as noted elsewhere herein. VCS 205 can cooperate with VSC 200 and other controllers to manage and control vehicle 100 in response to sensor and communication signals identified, established by, and received from these and similar vehicle systems and components.

VCS 205 can cooperate in parallel, in series, and distributively with VSC 200, and other controllers to manage and control the vehicle 100 in response to sensor and communication signals identified, generated by, established by, communicated to, and received from such vehicle systems and components. Such parameters, profiles, and settings of such profiles, may be driver selectable, adjustable, and viewable through a vehicle user interface of an onboard vehicle computing system, such as the above-noted Ford SYNC system, which be a part of, work in connection with, and/or incorporated as VCS 205, and other controllers and systems.

HEV 100 utilizes such sensors, parameters, and settings to enable performance control operational mode capabilities, in conjunction with the one or more controllers that are configured to manage such capabilities. For example, signals from a driver and various HEV components such as MCM/BCM 185 and APP 225, may demand power from CE 115 and/or EMs 120, 123, and may be embedded in and/or cause the controller(s) to generate TDS 240. In addition to TDS 240 and BS 245, the controllers may also generate various HEV control signals (CS) 250 and other signals (OS) 255, wherein any and/or all of such signals are utilized to communicate data to, between, and from various HEV components, sensors, systems, and controllers. Further, the controllers may embed information in and extract information from such signals, and may also communicate directly with other vehicle controllers, sensors, actuators, systems, and components, to enable various communications and operations.

For further example, various other vehicle functions, actuators, and components may be controlled by the controllers within the vehicle systems and components, and may receive signals from other controllers, sensors, and actuators, which may include, for purposes of illustration but not limitation, an alternator or generator, EMs 120, 123, ISCs 165, 167, high and low voltage batteries 170, 175, 180, and various sensors for regenerative braking, battery charging or discharging, operation mode control signals, maximum charge, state of charge signal (SoC signal), and battery and storage device charge and discharge power limits, charge power limits, discharge power limits, charge depletion and sustain charge limits, and temperature, voltage, current, differentiated and/or integrated current over time, battery pack cell voltages, drive train torque commands and detected torques, as well as digital data and information embedded in such signals, and as described in more detail elsewhere herein.

Figure 3:
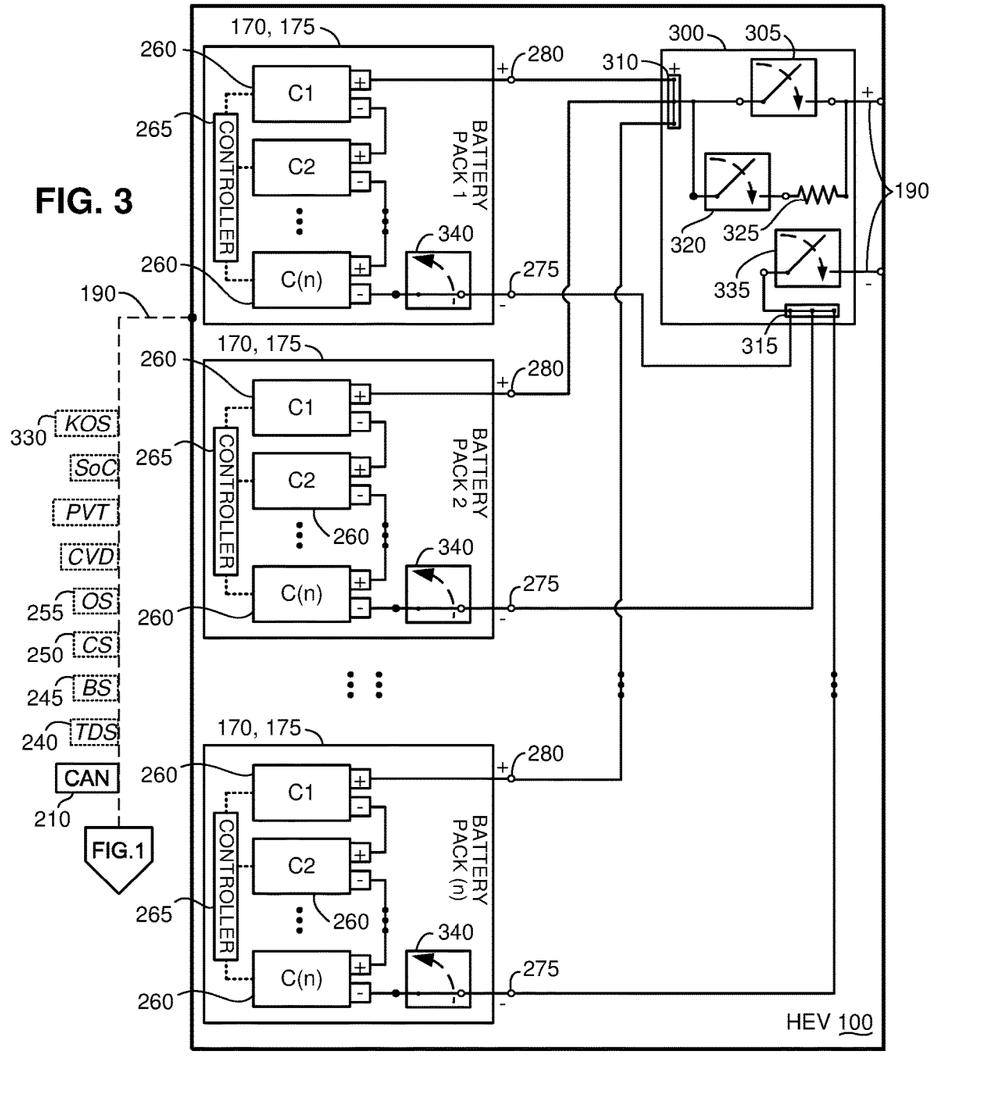
FIG. 3 depicts variations of the vehicle and systems of FIGS. 1 and 2, with certain elements added and removed for further illustration purposes.

As depicted in the various FIGS. 1, 2 and 3, and as described elsewhere herein, such control logic and executable instructions and signals, and data can also include vehicle control or command signals received from and sent to vehicle controllers, components, and systems. Such signals and commands may be generated by and communicated from any of the vehicle controllers, sensors, actuators, components, and systems. Other such controller(s), sensor(s), actuator(s), and components may also receive and be responsive to such signals. Any or all of these signals can be raw analog or digital signals or preconditioned, preprocessed, combination, and/or derivative signals generated in response to other signals, and embedding information therein.

The communication and operation of the described signals and commands. control instructions and logic, and data and information by the various contemplated controllers, sensors, actuators, and other vehicle components, may be represented schematically as shown in FIG. 1, and by flow charts or similar diagrams as exemplified in FIG. 2, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases, may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100, and with continued reference to FIGS. 1 and 2, HEV 100 incorporates controller(s) such as any and/or all of those described elsewhere herein that is/are coupled to EMs 120, 123, ISCs 165, 167, and/or HV battery(ies) 170, 175. The controller(s) is/are configured to respond to the described signals, including for example TDS 240, BS 245, CS 250 and/or OS 255, among other signals, and to detect various vehicle parameters and conditions, and to adjust various modes of operation of HEV 100 and the various components and systems thereof. In a specific example, HEV 100 includes at least one of EMs 120 and 123, which EMs 120 and 123 are respectively coupled via single vehicle power bus 190 and/or separately to batteries 170, 175, as is depicted schematically in FIG. 1.

Two such batteries and/or battery packs 170, 175 are shown in FIG. 1, as contemplated herein and as also depicted in FIGS. 2 and 3, the disclosure is directed to more than two such removable and replaceable battery packs 170, 175, such that up to "n" such battery packs 170, 175 are included in further arrangements of the disclosure. For example, battery packs 1 and are denoted by reference numerals 170, 175 as depicted in FIG. 2, and each may be either battery pack 170 or 175. In variations of the disclosure, HEV 100 includes 2, 3, 4, 5, or more or less such removable and replaceable battery packs 170 or 175. In a modified configuration of HEV 100 having 5 such battery packs 170 and 175, for further example without limitation, battery packs 1, 2, 3, 4, and 5 are included and are positioned in various locations about HEV 100, and coupled in parallel to vehicle power bus 190. In the various figures, vehicle power bus 190, terminals of battery packs 170, 175, and terminals of contactors and other components are labeled to have positive and negative bus lines and terminals designated respectively with a positive sign "+" and a negative sign "−", which for purposes of added illustration identify polarity of respective voltages.

Each battery pack 170, 175 includes conventional, series connected cells 260, and also incorporates a battery pack controller 265 that is coupled with each cell 260, and configured to detect cell voltages, temperatures, currents, and other parameters, which parameters are utilized to generate a state of charge (SoC) for each battery pack 170, 175 and the cells 260 therein. Each of cells 260 include positive and negative terminals that are connected in series arrangements. In variations of the disclosure, each battery pack 170, 175 includes only a single, normally open contactor 270 coupled to a negative terminal 275 or a positive terminal 280 of battery pack 170, 175.

As used herein, the phrase "normally open" refers to an open circuit condition that does not conduct current. In contrast, "normally closed" refers to a contactor condition that enables current to travel through the contactor. Battery packs 170, 175 utilize only single contactor 270 to improve performance over prior battery packs that included multiple contactors. Single contactor 270 reduces manufacturing cost and weight, and reduces energy consumption and heat generated, compared to prior battery systems that incorporate multiple contactors, and at least one contactor for each of the positive and negative terminals.

In the past, as many as three contactors were utilized in each battery pack 170, 175, which included a positive, negative, and precharge contactor, which tripled energy consumption, heat generation, cost, weight, as well as slowing response time of bringing packs online such that it could take as much as an extra 50 to 100 milliseconds per contactor for each additional battery pack contactor. Such contactors can weigh as much as about 100 to 200 grams each, and can each enough wasted energy to generate more than about 3.5 watts of waste heat during operation.

Battery packs 170, 175 are coupled to vehicle power bus 190 by a switch enclosure 300, which incorporates a normally open vehicle bus contactor 305, a positive terminal block 310, and a negative terminal block 315. Positive and negative terminal blocks 310, 315 couple battery packs 170, 175 together and to vehicle bus contactor 305. Switch enclosure 300 also includes variations that incorporate a normally open precharge contactor 320 and a current limiting device such as a resistor or similar device 325. The precharge contactor 320 when closed enables a limited current, such that a voltage across vehicle bus contactor 305 when open, is adjusted to be reduced to a contactor voltage difference (CVD) and/or zero, such that when vehicle bus contactor 305 is subsequently closed, an otherwise possible current surge and/or arcing in contactor 305 can be minimized or eliminated.

When vehicle bus contactor 305 is open, a potential or voltage may arise and/or develop across contactor 305, which can cause electrical arcs and/or current surges as vehicle bus contactor 305 closes. Such arcing and surging can cause undesirable wear of contactor 305, and can consume energy and generate heat. Reducing such arcs and surges can eliminate these unwanted occurrences and improve lifespan of contactor 305. Operating and closing precharge contactor 320, in advance of and before operating and closing vehicle bus contactor 305, can be utilized to reduce the voltage difference across vehicle bus contactor 305 to mitigate such possible arcs and surges. Commanding precharge contactor 320 to remain closed until the voltage difference is reduced to the CVD or zero, and to open thereafter, enables such mitigation. In some configurations, CVD may be less than about five volts or so, and/or less than about 10% of vehicle operating voltage, less than about 5%, and/or less than about 1% of the operating voltage of HEV 100.

One or more and/or at least one vehicle controller is/are coupled with the battery packs, and is/are configured to operate vehicle bus contactor 305 to connect and disconnect battery packs 170, 175 to the HEV 100. Such vehicle controller(s) include, for example without limitation, MCM/BCM/BECM 185, among others, which are configured to operate precharge contactor 320, and then vehicle bus contactor 305, in response to a key on signal KOS 330, among other signals. In response to such KOS 330, the vehicle controller(s) MCM/BCM/BECM 185, initiate a power on sequence for HEV 100 to enable operation.

As depicted in the various figures, including FIG. 2 and others, for illustration purposes, battery packs 1, 2, through battery pack number "n" are depicted (a symbolic, vertically oriented, three dot ellipsis represents battery packs 170, 175 up to number "n"). Similarly, with respect to each battery pack having cells C1, C2, through cell C(n), the symbolic, vertically oriented, three dot ellipsis represents cells C3, up to number "n"). For HEV 100 having an exemplary operating voltage of between about 140 and 420 volts, and more specifically having for example a 350 volt total operating voltage, each removable and replaceable battery pack 170 and 175 can be configured to include one-hundred (100) series-connected cells 260, which each have a full-charge voltage of 3.5 volts, which the figures would denote as cells C1 through C100.

In response to vehicle KOS 330, one or more of vehicle controller(s) MCM/BCM/BECM 185, and/or battery pack controller 265, operates single battery pack contactor 270, for one or more and/or at least one of battery packs 170, 175, which has voltage balanced cells 260. Battery pack controllers 265 detect voltage, SoC, and other parameters respective cells 260 of the same, respective battery pack 170, 175. More specifically, battery pack controller(s) 265 detect whether each of cells 260 are balanced and/or within a pack voltage threshold (PVT) relative to each other, such that controller(s) 265 further detect cells 260 to be voltage balanced when they are each within the PVT. When cells 260 are detected to be outside the PVT relative to one another, then battery pack controller(s) 265 detect and identify cells 260 as being unbalanced.

As may be understood by those knowledgeable in the field of technology, various battery chemistries can have improved performance and lifespan when operated in series, if each cell 260 is within the contemplated PVT relative to other cells in the respective single battery pack 170, 175. In examples of cells that have nominal, fully charged operating voltages of about 3.5 volts, the PVT can be about 10% or about 0.35 volts or less. More preferably, the PVT can be less than about 5% or about 0.17 or so. Even more preferably, the PVT can be less than about 1% or about 0.035 volts or so.

The battery pack controller(s) 265 can utilize these ranges of PVT to detect whether cells 260 of packs 170, 175 are balanced relative to one another either when fully charged and/or at SoCs less than full charge, and can detect an unbalanced condition otherwise. When the unbalanced condition is detected, battery pack controller(s) 265 are configured to take packs 170, 175 offline and to open contactor 270.

Battery pack controller(s) 265 are also configured to enable current to pass between cells 260, such that cells 260 can be balanced to be within the PVT, and to close battery pack contactor 270 once the balanced condition is again achieved. Controller(s) 265 may include and/or be coupled with passive resistance circuits coupled between cells 260 that enable current to flow between cells to enable such balancing, and may also include actively controlled circuits configured to communicate energy between cells 260 to enable such balancing. Battery pack controller(s) 265 may in other variations also be configured to receive power from vehicle bus 190 to enable recharging of one or more cells 260 such that balancing can be augmented to bring cells 260 within PVT relative to the other cells 260 in pack 170, 175.

In other modifications of the disclosure, battery pack controller(s) 265 are further configured to, when an unbalanced condition of cells 260 is detected, reject a close command from the one or more and/or at least one vehicle controller(s) MCM/BCM/BECM 185 and/or, such that battery pack contactor 270 remains open or is commanded to open, taking battery packs 170, 175 offline, until balancing of cells 260 is achieved.

In modified adaptations of the disclosure, battery pack controller(s) 265 is/are further configured to, in response to detecting an out of range condition for one or more of the voltage, current, and temperature of one or more cells 260, to open single battery pack contactor 270. The disclosure is also directed to modifications the at least one controller such as battery pack controller 265 is configured to command another of the single battery pack contactors 270 to close, for respective battery packs 170, 175, which have cells 260 that meet and/or are within the pack voltage threshold.

In further exemplary variations, and with continuing reference also to FIG. 2, the disclosure contemplates single battery pack contactor 270 coupled to a negative terminal 275 of the respective battery packs 170, 175, and a negative terminal of vehicle power bus 190, and vehicle bus contactor 305 coupled to a positive terminal of vehicle power bus 190. With reference also to FIG. 3, additional modifications of the disclosure include a second, normally open vehicle bus contactor 335 that is coupled to the negative terminal of vehicle power bus 190. Also depicted in FIG. 3 as additional examples of variations of the disclosure, a normally closed single battery pack contactor 340 is shown coupled with the negative side vehicle power bus 190 and negative terminal of the respective battery packs 170, 175, which enables further operational flexibility for certain configurations of HEV 100.

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

What is claimed is:

1. A vehicle, comprising:
   a plurality of battery packs each having battery cells connected in series, a positive terminal, a negative terminal, and a single pack contactor associated with one of the terminals, wherein the single contactor is biased to an open position;
   a switch enclosure having disposed therein a positive terminal block, a negative terminal block, and a vehicle bus contactor, wherein the positive terminal of each battery pack is connected to the positive terminal block and the negative terminal of each battery pack is connected to the negative terminal block to arrange the battery packs in parallel, and wherein the switch enclosure electrically connects the positive and negative terminal blocks to a power bus when the vehicle bus contactor is closed; and
   at least one controller coupled to the packs and configured to, responsive to a key on signal, (i) determine a subset of the battery packs having balanced cells, (ii) command closed the single contactors associated with the battery packs in the subset, and (iii) subsequent to the single contactors of the subset closing, command closed the bus contactor to electrically connect the subset to the power bus.

2. The vehicle according to claim 1, wherein the vehicle bus contactor is connected between the positive terminal block and the power bus, and the negative terminal block is directly connected to the power bus.

3. The vehicle according to claim 1, further comprising:
   each battery pack incorporating a battery pack controller configured to:
      detect voltage of the cells,
      reject the close command and open the single pack contactor, in response to the detected voltage of any cell being unbalanced relative to the remaining cells, and
      adjust a state of charge of unbalanced cells until balanced with the remaining cells according to a pack voltage threshold.

4. The vehicle according to claim 1, further comprising:
   each battery pack incorporating a battery pack controller configured to:
      detect voltage, current, and temperature of each cell, and
      open the single pack contactor, in response to detecting an out of range condition for one or more of the voltage, current, and temperature.

5. The vehicle according to claim 1, further comprising:
the single pack contactor coupled to a negative terminal of the battery pack and a negative terminal of a vehicle power bus; and
the bus contactor coupled to a positive terminal of the vehicle power bus.

6. The vehicle according to claim 1, further comprising:
the single pack contactor coupled to a negative terminal of the battery pack;
the bus contactor coupled to a positive terminal of the vehicle power bus; and
a second bus contactor coupled between the single pack contactor and the negative terminal of the vehicle power bus.

7. The vehicle according to claim 1, wherein the single pack contractors are associated with the negative terminals.

8. The vehicle according to claim 1, further comprising:
the at least one controller further configured to command other of the single pack contactors to close, for respective battery packs having cells that meet a pack voltage threshold such that they are balanced relative to one another.

9. The vehicle according to claim 8, further comprising:
each battery pack incorporating a battery pack controller configured to:
detect voltage, current, and temperature of the cells, and
open the single pack contactor, in response to detecting an out of range condition for one or more of the voltage, current, and temperature.

10. The vehicle according to claim 8, further comprising:
the at least one controller further configured to:
open the single pack contactor in response to the detected voltage of any cell of a respective battery pack being unbalanced relative to the remaining cells,
adjust a state of charge of unbalanced cells until balanced with the remaining cells according to the pack voltage threshold, and
closing the single pack contactor for the respective battery pack.

11. A method of controlling a vehicle, comprising:
by at least one controller,
in communication with a bus contactor coupled in parallel to battery packs having a single contactor coupled to series connected cells, and a pack controller configured to detect cell voltage;
responsive to a key on signal:
closing the single contactor to the bus contactor, for packs having balanced cells, and then closing the bus contactor to deliver power to the vehicle; and
by the battery pack controller:
detecting voltage of the cells,
rejecting the close command,
opening the single pack contactor, in response to the detected voltage of any cell being unbalanced relative to the remaining cells,
adjusting a state of charge of unbalanced cells until balanced with the remaining cells according to a pack voltage threshold, and
closing the single pack contactor after the cells are balanced.

12. The method of controlling a vehicle according to claim 11, further comprising:
the bus contactor also coupled to a precharge contactor; and
by the at least one controller,
commanding the precharge contactor to close, before closing the bus contactor, and until an open circuit voltage of the bus contactor is reduced to a contactor voltage difference.

13. The method of controlling a vehicle according to claim 11, further comprising:
the single pack contactor configured as normally closed;
a second bus contactor and the bus contactor configured as normally open; and
by the battery pack controller:
detecting voltage, current, and temperature of each cell, and
opening the single pack contactor, in response to detecting an out of range condition for one or more of the voltage, current, and temperature.

14. The method of controlling a vehicle according to claim 11, further comprising:
by the battery pack controller:
opening the single pack contactor, in response to the detected voltage of any cell of a respective battery pack being unbalanced relative to the remaining cells,
adjusting a state of charge of unbalanced cells until balanced with the remaining cells according to a pack voltage threshold, and
closing the single pack contactor for the respective battery pack.

* * * * *